(No Model.) 2 Sheets—Sheet 1.

G. L. STUEBNER.
CAR TRUCK.

No. 495,849. Patented Apr. 18, 1893.

WITNESSES:
F. McArdle
C. Sedgwick

INVENTOR
G. L. Stuebner
BY Munn & Co.
ATTORNEYS.

(No Model.) 2 Sheets—Sheet 2.
G. L. STUEBNER.
CAR TRUCK.
No. 495,849. Patented Apr. 18, 1893.
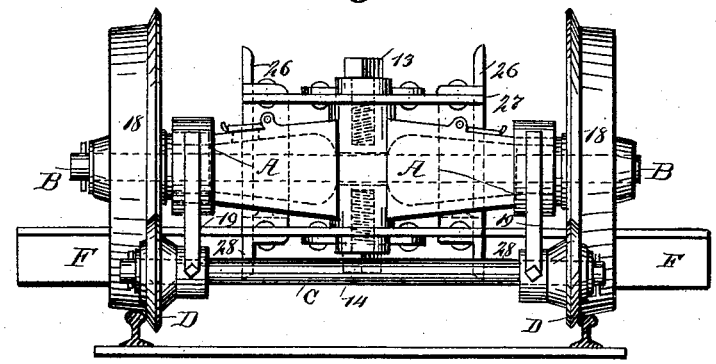
WITNESSES:
H. McArdle,
C. Sedgwick
INVENTOR
G. L. Stuebner
BY Munn & Co
ATTORNEYS.

UNITED STATES PATENT OFFICE.

GUSTAVUS L. STUEBNER, OF LONG ISLAND CITY, NEW YORK.

CAR-TRUCK.

SPECIFICATION forming part of Letters Patent No. 495,849, dated April 18, 1893.

Application filed January 17, 1893. Serial No. 458,629. (No model.)

*To all whom it may concern:*

Be it known that I, GUSTAVUS L. STUEBNER, of Long Island City, in the county of Queens and State of New York, have invented a new and useful Improvement in Car-Trucks, of which the following is a full, clear, and exact description.

My invention is an improvement in the class of car trucks which are provided with pilot, or advance, wheels, for the purpose of keeping the trucks on the track in passing swiftly around short curves.

The invention consists in the novel construction and combination of the several parts, as will be hereinafter fully set forth and pointed out in the claims.

Reference is to be had to the accompanying drawings forming a part of this specification, in which similar figures and letters of reference indicate corresponding parts in all the views.

Figure 1:
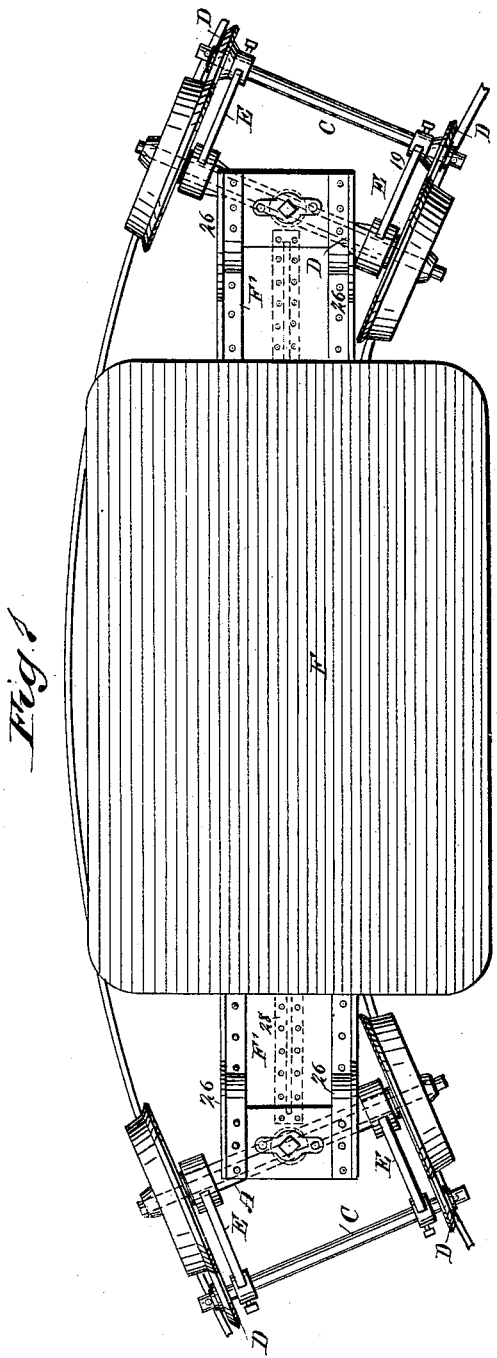
Figure 2:
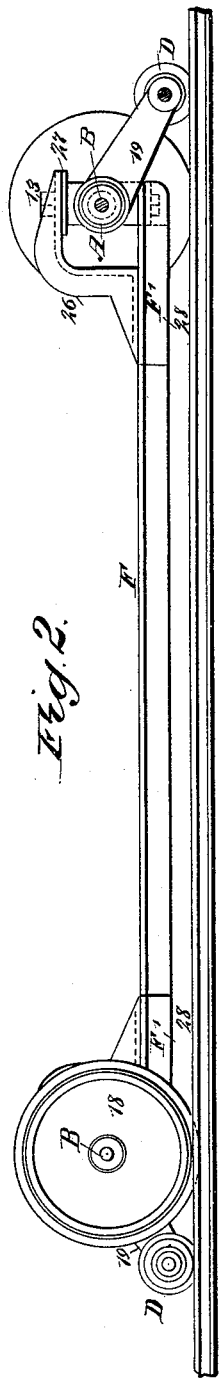
Figure 3:
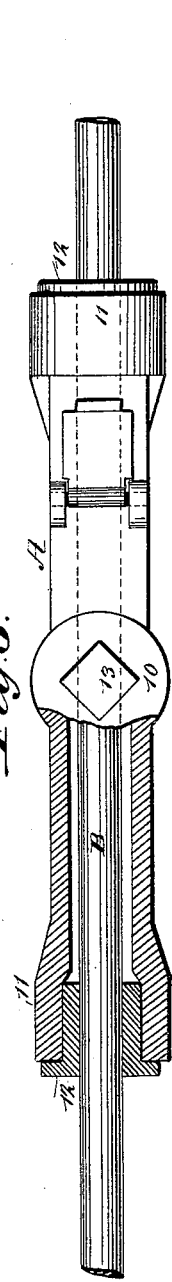

Figure 1 is a plan view of a tram car having the improved truck applied thereto, illustrating the car in position upon a very short curve. Fig. 2 is a side elevation of the car and its truck. Fig. 3 is a plan view partially in section, of the axle and bolster of the truck. Fig. 4 is a front elevation of the truck and car. Fig. 5 is a front elevation partly in section, of the bolster of the truck, illustrating the axle as journaled therein. Fig. 6 is an end view of the bolster. Fig. 7 is a plan view of one of the guide wheels of the truck. Fig. 8 is a partial plan view of one of the truck wheels proper; and Figs. 9 and 10, are respectively a side elevation and end view of the arms projected from the bolster of the truck and adapted to support the axle of the guide wheels.

As an illustration of the invention a tram car has been employed to show the connection therewith of the improved truck; and in carrying out the invention the truck consists primarily of a bolster A, adapted to receive an axle B, an advance axle C, guide wheels D carried by the advance axle, and a connection E between the bolster and the advance axle. The bolster is best shown in Figs. 3, 5 and 6, and the said bolster is deepest at its central portion, being made smaller from its center in direction of its ends. The central portion of the bolster is preferably made circular, as shown at 10 in Fig. 5, and the end portions of the axle are formed in like manner, as shown at 11 in the same figure, but the portions intermediate of the center and the ends may be made rectangular in cross section, or may be given any desired contour. The bolster is hollow and is open at each of its ends, and bushings 12, are fitted in the end portions of the axle in any suitable or approved manner, to serve as trunnions for the main axle B of the truck.

In the central portion of the bolster an upper king bolt 13, is located, and in the lower portion a second king bolt 14, is placed. The interior of the bolster is provided with a packing 15 of waste or the equivalent thereof, or any material capable of absorbing oil, as the packing is adapted to be brought in constant contact with the main axle B to lubricate it, and the oil is ordinarily introduced into the bolster through openings 16, made in the upper face of the bolster at each side of its center, the openings being normally closed by hinged caps 17 or their equivalents. The main axle B, extends beyond the ends of the bolster, and upon the axle the ordinary car wheels 18 are secured.

The axle C, is located in advance of the bolster, and the connections E between the advance axles C and the bolsters are accomplished through the medium of links 19, shown in detail in Figs. 9 and 10. These links are ordinarily made tapering, their forward ends being narrower than their inner ones, and at the inner end of each of the links an eye 20, is formed, adapted to receive an extremity of a bolster, and at the eye 20, two set screws 21, are usually placed, whereby the links may be securely attached to the bolsters. The links when attached may be made to assume a forward or outward downward inclination, and at their outer or forward ends each link is provided with a smaller eye 22, usually provided with a single set screw 23; and the eyes 22, are adapted to serve as boxes for the advance axle C, the said screws entering grooves produced in the axle in the customary manner, thus preventing the advance axle from having side motion or end thrust, while the axle is free to turn in its bearings.

The advance axle, when it is free to turn in its bearings, has rigidly secured thereon guide wheels D, one being near each extremity; but if the advance axle is securely fastened to the links 19 the guide wheels D, are made to turn loosely upon the axle. The guide wheels D, as shown in Figs. 1 and 4, are adapted to engage with the inner face of the head or tread of the rails, and serve as pilots for the main wheels of the truck. Therefore, the guide wheels may with equal propriety be termed pilot wheels. The guide wheels are quite small; in fact, they need not be any larger than would be required to have a firm bearing against the inner faces of the track over which the car is to travel.

The trucks are adapted to be pivotally connected with a car, and the pivotal connection between the trucks and the car is effected by attaching the body of the car to the bolster of a truck, preferably at the top and bottom thereof.

In the matter of tram cars the platform F is of any approved construction or may be given any required shape, or may be of any required size, and from the central portion of the end of each platform F a horizontal extension F' is projected. Each of the extensions has projected upward from it between its outer and rear end an angular arm 26. This arm is preferably made of angle iron, and its shank extends back of the platform, as shown in Fig. 1. Therefore quite a distance intervenes between the extensions or projections F' of the platform and the upper or horizontal members of the bracket arms 26.

The bracket arms are connected by a transverse bar or plate 27; and this plate at its center is connected with the upper central portion of a truck through the medium of the upper king bolt 13, while the lower central portion of the truck is connected with the front or outer portion of the extension or projection F' of the platform through the medium of the lower king bolt 14; and in order to strengthen the extensions of the platforms the lower portions of the platforms at their side edges are bolted or otherwise secured to angle irons 28, as shown in Fig. 4.

It will be readily observed that when trucks are constructed as has been above set forth and as may be seen by reference to Fig. 1, a car carrying the trucks may be rapidly carried around exceedingly short curves without danger of derailment, as the advance guide or pilot wheels D, will effectually prevent the main wheels from leaving the track, and the truck by reason of its pivotal engagement with the body of the car is enabled to accommodate itself to exceedingly sharp and quick turns.

Having thus described my invention, I claim as new and desire to secure by Letters Patent—

1. In a car truck, the combination, with a hollow bolster, an axle journaled in the bolster, and a packing located in the bolster in engagement with the axle, of supporting wheels carried by the axle, arms projected from the bolster, a shaft journaled in the arms, and guide wheels of less diameter than the supporting wheels carried by the advance axle and adapted to engage with the inner surfaces of the rails over which the supporting wheels pass, as and for the purpose specified.

2. The combination, with a hollow bolster having bearings in its ends, a main axle journaled in the bearings of the bolster, a packing located within the bolster and adapted for engagement with the axle, and supporting wheels located at the extremities of the axle, of arms outwardly and downwardly projected from the bolster, an auxiliary axle journaled in the outer ends of the arms, and guide or pilot wheels carried by the advance or outer axle, the guide or pilot wheels being of less diameter than the supporting wheels and held in engagement with the inner face of the track over which the supporting wheels pass, as and for the purpose specified.

3. The combination, with a car body, a platform projected from the ends thereof, and angled brackets secured to the platform and extending upwardly and outwardly over it, of a bolster having pivotal connection with the platform and the brackets, an axle journaled in the bolster, supporting wheels carried by the axle, bracket arms projected outwardly and downwardly from the bolster, an advance or auxiliary axle carried by the said bracket arms, and guide or pilot wheels connected with the auxiliary axle and adapted for engagement with the inner faces of the track over which the supporting wheels are to travel, as and for the purpose set forth.

GUSTAVUS L. STUEBNER.

Witnesses:
WATSON BOWSON,
ALBERT T. WYCKOFF.